United States Patent
Munro et al.

(10) Patent No.: US 7,346,246 B2
(45) Date of Patent: Mar. 18, 2008

(54) QUANTUM INFORMATION PROCESSING METHOD AND APPARATUS

(75) Inventors: William John Munro, Bristol (GB); Gerard James Milburn, Brisbane (AU); Timothy Cameron Ralph, Brisbane (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/487,980

(22) PCT Filed: Aug. 28, 2002

(86) PCT No.: PCT/GB02/03943

§ 371 (c)(1), (2), (4) Date: Aug. 6, 2004

(87) PCT Pub. No.: WO03/021527

PCT Pub. Date: Mar. 12, 2003

(65) Prior Publication Data

US 2004/0264898 A1    Dec. 30, 2004

(30) Foreign Application Priority Data

Aug. 28, 2001    (GB) ................... 0120744.8

(51) Int. Cl.
*G02B 6/00* (2006.01)
*G06F 17/00* (2006.01)
*G06F 15/18* (2006.01)

(52) U.S. Cl. .................. 385/122; 700/244; 706/14
(58) Field of Classification Search ........... 385/122; 700/244; 706/14
See application file for complete search history.

(56) References Cited

U.S. PATENT DOCUMENTS

| 5,917,322 A | * | 6/1999 | Gershenfeld et al. | ....... 324/307 |
| 6,578,018 B1 | * | 6/2003 | Ulyanov | ............. 706/14 |
| 7,113,967 B2 | * | 9/2006 | Cleve et al. | ........... 708/403 |
| 2002/0199108 A1 | * | 12/2002 | Chuang et al. | ........... 713/176 |
| 2003/0005010 A1 | * | 1/2003 | Cleve et al. | ........... 709/403 |

FOREIGN PATENT DOCUMENTS

WO    WO99/53410    10/1999

OTHER PUBLICATIONS

Cochran et al., 'Macroscopically distinct quantum-superposition states as a bosonic code for amplitude damping', the American Physical Society, 1999, vol. 59, No. 4, (pp. 2631-2634).*

(Continued)

*Primary Examiner*—K. Cyrus Kianni
(74) *Attorney, Agent, or Firm*—Ladas & Parry LLP

(57) ABSTRACT

A method and apparatus for quantum information processing is disclosed in which logical qubits $|0>_L$ and $|1>_L$ are respectively encoded by different near orthogonal coherent states $|\beta>$ and $|\alpha>$, where $<\alpha|\beta>\approx 0$, $|\alpha>$ and $|\beta>$ being the computational basis states for the qubits, for example, in which logical qubits $|0>_L$ and $|1>_L$ are respectively encoded by different ones of the vacuum state $|0>$ and a multi-photon optical coherent state $|\alpha>$ which states are the computational basis states for the qubits. This provide an efficient scheme for linear optics quantum processing which is deterministic and for which qubit readout can use homodyne detection which is highly efficient. The invention finds application in quantum computation and quantum communication.

13 Claims, 3 Drawing Sheets

OTHER PUBLICATIONS

Brune, M., et al., "Observing the Progressive Decoherence of the 'Meter' in a Quantum Measurement," *Physical Review Letters*, vol. 77, No. 24, pp. 4887-4890 (Dec. 9, 1996).

Cochrane, P.T., et al., "Macroscopically Distinct Quantum-Superposition States as a Bosonic Code for Amplitude Damping," *Physical Review A*, vol. 59, No. 4, pp. 2631-2634 (Apr. 1999).

Furusawa, A., et al., "Unconditional Quantum Teleportation," *Science*, vol. 282, pp. 706-709 (Oct. 23, 1998).

Knill, E., et al., "A Scheme for Efficient Quantum Computation With Linear Optics," *Nature*, vol. 409, pp. 46-52 (Jan. 4, 2001).

Kwiat, P.G., et al., "Ultrabright Source of Polarization-Entangled Photons," *Physical Review A*, vol. 60, No. 2, pp. R773-R776 (Aug. 1999).

Reggiani, S., et al., "Two-Qbit Gates Based on Coupled Quantum Wires," *International Conference on Simulation Semiconductor Processes and Devices*, Seattle, Washington, pp. 184-187 (Sep. 6-8, 2000).

Rieffel, E., "An Introduction to Quantum Computing for Non-Physicists," INTERNET: <http://arxiv.org/quant-ph/9809016> pp. 1-45 (Jan. 19, 2000).

Tittel, W., et al., "Experimental Demonstration of Quantum Correlations Over More Than 10km," *Physical Review A*, vol. 57, No. 5, pp. 3229-3232 (May 1998).

Turchette, Q.A., et al., "Measurement of Conditional Phase Shifts for Quantum Logic," *Physical Review Letters*, pp. 1-4 (Dec. 1995).

Zeilinger, A., "Fundamentals of Quantum Information," *Physics World*, vol. 11, No. 3, pp. 35-40 (Mar. 1998).

* cited by examiner

US 7,346,246 B2

QUANTUM INFORMATION PROCESSING METHOD AND APPARATUS

FIELD OF THE INVENTION

The present invention relates to a method and apparatus for quantum information processing. The invention is particularly, but not exclusively, applicable to quantum computation and quantum information processing.

BACKGROUND OF THE INVENTION

Quantum optics has proved a fertile field for experimental tests of quantum information science, from experimental verification of Bell inequality violations [Kwiat, P. G., Waks, E., White, A. G., Appelbaum, I., and Eberhard, P. H. Ultrabright source of polarization-entangled photons. *Phys. Rev. A* 60, R773 (1999), Tittel, W., Brendel, J., Gisin, B., Herzog, T., Zbinden, H., and Gisin, N. Experimental demonstration of quantum correlations over more than 10 km. *Phys. Rev. A* 57, 3229-3232 (1998)] to quantum teleportation [Bouwmeester, D., Pan, J. W., Mattle, K., Eibl, M., Weinfurter, H., and Zeilinger, A. Experimental quantum teleportation. *Nature* 390, 575-579 (1997), Furasawa, A., Sorensen, J. L., Braunstein, S. L., Fuchs, C. A., Kimble, H. J., and Polzik, E. S. Unconditional quantum teleportation. *Science* 282, 706-709 (1998)]. However, quantum optics has not thought to provide a practical path to efficient and scalable quantum computation, and most current efforts to achieve this have focussed on solid state implementations. This orthodoxy was challenged recently when Knill et al. [Knill, E., Laflamme, L., and Milburn, G. J. Efficient linear optics quantum computation. *Nature* 409, 46 (2001)] showed that, given single photon sources and single photon detectors, linear optics alone would suffice to implement efficient quantum computation. While this result is surprising, the complexity of the optical networks required is daunting.

SUMMARY OF THE INVENTION

The present invention seeks to provide an efficient scheme which is elegant in its simplicity and, consequently, more practicable to implant. In a first aspect, a method of quantum information processing is provided in which logical qubits $|0>_L$ and $|1>_L$ are respectively encoded by different near orthogonal coherent states $|\beta>$ and $|\alpha>$, where $<\alpha|\beta>\approx 0$, $|\alpha>$ and $|\beta>$ being the computational basis states for the qubits.

The logical qubits $|0>_L$ and $|1>_L$ may be respectively encoded by different ones of the vacuum state $|0>$ and a multi-photon optical coherent state $|\alpha>$ which states are the computational basis states for qubits of the quantum computation, for example.

In one embodiment the control and target states of a gate are initially in the combined state $|\phi_{CT}>^{in}$ where $$|\phi_{CT}>^{in} = C_0|0>_C|0>_T + C_1|0>_C|\alpha>_T + C_2|\alpha>_C|0>_T + C_3|\alpha>_C|\alpha>_T$$

and in which this combined state is manipulated to produce a combined output state $|\phi_{CT}>^{out}$ where $$|\phi_{CT}>^{out} = C_0|0>_C|0>_T + C_1|0>_C|\alpha>_T + C_2|\alpha>_C|0>_T - C_3|\alpha>_C|\alpha>_T$$

where $$\sum_{i=0}^{3}|C_i|^2 = 1$$

and in which the control and target qubits are manipulated by the gate such that the input states $|0>_C|0>_T$, $|0>_C|\alpha>_T$, $|\alpha>_C|0>_T$, $|\alpha>_C|\alpha>_T$ are transformed to the output states $|0>_C|0>_T$, $|0>_C|\alpha>_T$, $|\alpha>_C|0>_T$, $-|\alpha>_C|\alpha>_T$, respectively.

The control qubit and the target qubit may be manipulated by a beamsplitter or using a Kerr medium.

In this embodiment a qubit may be subject to a bit flip transformation in which the qubit is mixed with a coherent optical field of sufficient strength on a highly reflective beamsplitter to produce a displacement of $-\alpha$, where $D(\alpha)|0>=|\alpha>$ followed by a half-wavelength delay to provide a $\pi$ phase shift of the coherent amplitude, the input states $|0>$ and $|\alpha>$ being transformed to output states $|\alpha>$ and $|0>$, respectively.

The method of the present invention may also include imposing a phase shift on a qubit to produce a rotation that is diagonal in the computational basis states.

The control qubit may be an arbitrary state to be transformed according to a predetermined qubit rotation, and the target qubit is the state $$\frac{1}{\sqrt{2}}(|0\rangle + |\alpha\rangle),$$

the output states being subject to a bit flip transformation if the output control qubit is determined not to be the same state as the control state.

The step of determining whether the input control state and output control state are the same may include displacing the output control state by $-\alpha/2$ and determining if the photon number of the displaced output control state is odd or even. This may be achieved by homodyne detection of the imaginary quadrature of the output control state.

The states $|0>$ and $|\alpha>$ may be the ouput states of a single mode, stabilised laser, a waveguide or a molecule. The readout of the output qubit may be effected by homodyne detection and/or by parity detection.

The present invention, in a second aspect, provides an apparatus for processing quantum information, comprising: a source of near orthogonal coherent states $|\beta>$ and $|\alpha)>$, where $<\alpha|\beta>\approx 0$, means for forming qubits having said states $|\beta>$ and $|\alpha>$ as computational basis states for said qubits, logical qubits $|0>_L$ and $|1>_L$, respectively being encoded by different ones of said states $|\beta>$ and $|\alpha>$.

The logical qubits $|0>_L$ and $|1>_L$ may be respectively encoded by different ones of the vacuum state $|0>$ and a multi-photon optical coherent state $|\alpha>$ which states are the computational basis states for the qubits.

The apparatus may include a two-qubit gate, the control and target states of said gate being initially in the combined state $|\phi_{CT}>^{in}$ where $$|\phi_{CT}>^{in} = C_0|0>_C|0>_T + C_1|0>_C|\alpha>_T + C_2|\alpha>_C|0>_T + C_3|\alpha>_C|\alpha>_T.$$

The apparatus may include manipulating means by which this combined state is manipulated to produce a combined output state $|\phi_{CT}\rangle^{out}$ where $$|\phi_{CT}\rangle^{out} = C_0|0\rangle_C|0\rangle_T + C_1|0\rangle_C|\alpha\rangle_T + C_2|\alpha\rangle_C|0\rangle_T - C_3|\alpha\rangle_C|\alpha\rangle_T$$

where $$\sum_{i=0}^{3} |C_i|^2 = 1$$

and by which the control and target qubits are manipulated by said gate such that the input states $|0\rangle_C|0\rangle_T$, $|0\rangle_C|\alpha\rangle_T$, $|\alpha\rangle_C|0\rangle_T$, $|\alpha\rangle_C|\alpha\rangle_T$ are transformed to the output states $|0\rangle_C|0\rangle_T$, $|0\rangle_C|\alpha\rangle_T$, $|\alpha\rangle_C|0\rangle_T$, $-|\alpha\rangle_C|\alpha\rangle_T$, respectively.

The manipulating means may be a beamsplitter or include a Kerr medium.

The apparatus may include a highly reflective beamsplitter by which a qubit is subject to a bit flip transformation in which the qubit is mixed with a coherent optical field of sufficient strength to produce a displacement of $-\alpha$, where $D(\alpha)|0\rangle = |\alpha\rangle$. It may include a delay means by which the flip transformation is followed by a half-wavelength delay to provide a $\pi$ phase shift of the coherent amplitude, the input states $|0\rangle$ and $|\alpha\rangle$ being transformed to output states $|\alpha\rangle$ and $|0\rangle$, respectively, followed by forming the output qubit $$\frac{1}{\sqrt{2}}(|0\rangle + |\alpha\rangle)$$

and then applying a bit flip to the output qubit.

There may be included a phase shift means by which a phase shift is imposed on a qubit to produce a rotation that is diagonal in the computational basis states.

The control qubit is an arbitrary state to be transformed according to a predetermined qubit rotation, and the target qubit is the state $$\frac{1}{\sqrt{2}}(|0\rangle + |\alpha\rangle),$$

the apparatus including a bit transformation means by which the output states are subject to a bit flip transformation if the output control qubit is determined not to be the same state as the control state.

The apparatus may include a displacement means for displacing the output control state by $-\alpha/2$ and means for determining if the photon number of the displaced output control state is odd or even, thereby determining whether the input control state and the output control state are the same.

In particular, the apparatus may include a homodyne detector arranged to determine whether the input control state and output control state are the same by homodyne detection of the imaginary quadrature of the output control state.

The source of the states $|0\rangle$ and $|\alpha\rangle$ may be single mode, stabilised laser, a waveguide or a molecule.

Readout of a qubit may be effected by homodyne detection, for example, and/or by parity detection.

The apparatus of the present invention may be a quantum computer or be a communication device, for example.

By encoding the quantum information in multi-photon coherent states, rather than single photon states, simple optical manipulations acquire unexpected power. The required resource, which may be produced non-deterministically, is a superposition of the vacuum and a coherent state, for example. Given this, the scheme is deterministic and requires only simple linear optics and photon counting. Qubit readout may use homodyne detection which can be highly efficient.

The output of a single mode, stabilised laser can be described by a coherent state, $|\alpha\rangle$ where $\alpha$ is a complex number which determines the average field amplitude. Coherent states are defined by unitary transformation of the vacuum [Walls, D. F. and Milburn, G. J. *Quantum Optics*. Springer, Berlin, (1994)], $|\alpha\rangle = D(\alpha)|0\rangle$, where $D(\alpha)$ is the displacement operator. Let us consider an encoding of logical qubits in coherent states with "binary pulse code modulation", $$|0\rangle_L = |0\rangle \qquad (1)$$

$$|1\rangle_L = |\alpha\rangle \qquad (2)$$

where we take $\alpha$ to be real. The advantage of using such states is that detection is relatively easy, requiring only efficient homodyne detection [Polzik, E. S., Carry, J., and Kimble, H. J. Spectroscopy with squeezed light. *Phys. Rev. Lett.* 68, 3020-3023 (1992)].

These qubits are not exactly orthogonal, but the approximation to orthogonality is good for $\alpha$ even moderately large, $$\langle\alpha|0\rangle = e^{-\alpha^2/2} \qquad (3)$$

We will assume for most of this application that $\alpha \gg 1$.

In single photon optics two qubit gates, in which the state of one photon controls the state of the other, represent a formidable challenge. It has been found by the present applicant that, surprisingly, for the coherent state encoding scheme of the present invention, a non-trivial two-qubit gate can be implemented using only a single beamsplitter. Consider the beamsplitter interaction given by the unitary transformation $$U_{BS} = \exp[i\theta(ab^\dagger + a^\dagger b)] \qquad (4)$$

where a and b are the annihilation operators corresponding to two coherent state qubits $|\gamma\rangle_a$ and $|\beta\rangle_b$ with $\gamma$ and $\beta$ taking values of $\alpha$ or 0. It is well known that the output state produced by such an interaction is $$U_{BS}|\gamma\rangle_a|\beta\rangle_b = |\cos\theta\gamma + i\sin\theta\beta\rangle_a|\cos\theta\beta + i\sin\theta\gamma\rangle_b \qquad (5)$$

where $\cos^2\theta$ ($\sin^2\theta$) is the reflectivity (transmissivity) of the beamsplitter. Now consider the overlap between the output and input states. Using the relationship [Walls, D. F. and Milburn, G. J. *Quantum Optics*. Springer, Berlin, (1994)] $\langle\tau|\alpha\rangle = \exp[-\frac{1}{2}(|\tau|^2 + |\alpha|^2) + \tau^*\alpha]$ we find $$\langle\gamma|_a\langle\beta|_b|\cos\theta\gamma + i\sin\theta\beta\rangle_a|\cos\theta\beta + i\sin\theta\gamma\rangle_b = \exp[-(\gamma^2 + \beta^2)(1-\cos\theta) + 2i\sin\theta\gamma\beta] \qquad (6)$$

Now suppose that $\theta$ is sufficiently small such that $\theta^2\alpha^2 \ll 1$ but that $\alpha$ is sufficiently large that $\theta\alpha^2$ is of order one. Physically this corresponds to an almost perfectly reflecting beamsplitter. Eq. 6 then approximately becomes $$\langle\gamma|_a\langle\beta|_b|\cos\theta\gamma + i\sin\theta\beta\rangle_a|\cos\theta\beta + \sin\theta\gamma\rangle_b \approx \exp[2i\theta\gamma\beta] \qquad (7)$$

Eq. 7 shows that the only difference between the input and output states of the beamsplitter is a phase shift proportional to the amplitudes of the input quibits, that is:

$$U_{BS}|\gamma>_a|\beta>_b \approx \exp[2i\theta\gamma\beta]|\gamma>_a|\beta>_b \quad (8)$$

If conditions are such that Eq. 8 is a good approximation and we further require that $\theta\alpha^2=\pi/2$ then this transformation produced a controlled sign shift gate. That is, if either or both of the qubits are in the logical zero state ($\gamma=0$) and/or ($\beta=0$) the transformation produced no effect on the state. However, if both modes are initially in the logical one state (ie. $\gamma=\beta=\alpha$) then a sign change is produced. Such a gate is a universal two qubit gate.

For universal computation we require, in addition to the two qubit gate above, the ability to do arbitrary rotations that are diagonal in the computational basis, bit-flip operations, plus the Hadamard gate [Nielsen, M. and Chuang, I. *Quantum computation and quantum information*. Cambridge University Press, Cambridge, UK, (2000)]. The Hadamard gate cannot be implemented unitarily with linear optics. However, we will show shortly that, provided the necessary quantum resource is provided, it can be implemented using only linear optics and conditional measurements.

First let us consider some single qubit transformations that can be achieved with just linear objects. A bit flip gate flips the state of the system from a logical zero to a logical one, and vice versa and is equivalent to the pauli $\sigma_x \equiv X$ matrix, in the computational basis. The bit flip transformation operator, X, is equivalent to a displacement of $-\alpha$ followed by a $\pi$ phase shift of the coherent amplitude:

$$X=U(\pi)D(-\alpha) \quad (9)$$

where $U(\pi)=\exp[i\pi a \backslash a]$ is physically just a half-wavelength delay, whilst a displacement can be implemented by mixing a very strong coherent field with the qubit on a highly reflective beamsplitter [Furasawa, A., Sorensen, J. L., Braunstein, S. L., Fuchs, C. A., Kimble, H. J., and Polzik, E. S. Unconditional quantum teleportation. *Science* 282, 706-709 (1998)].

The phase rotation gate produces a rotation that is diagonal in the computational basis, $R_{100}(\mu|0>_L+v|1>_L)=\mu|0>_L+e^{i\Phi}v|1>_L$. It can be implemented, to a good approximation, by imposing a small phase shift on the qubit. Using arguments similar to those leading to Eq. 8 we find $$U(\epsilon)|\alpha>=e^{i\epsilon a^\dagger a}|\alpha> \approx e^{i\epsilon\alpha^2}|\alpha>=R_\phi|\alpha> \quad (10)$$

with $\phi=\epsilon a^2$. We have assumed $\epsilon$ scales as $1/\alpha^2$.

In addition to these gates, we require a Hadamard gate in order to achieve an arbitrary qubit rotation. The Hadamard gate, H induces the following transformations on the logical states:

$$H|0>_L=|0>_L+|1>_L=|0>+|\alpha>$$

$$H|1>_L=|0>_L-|1>_L=|0>-|\alpha> \quad (11)$$

The outputs are a superposition of two widely separated coherent states, commonly known as "cat" states. Such states are highly non classical and for unitary generation require a Kerr non-linearity for which the Hamiltonian is proportional to $(a\backslash a)^2$. Such interactions are typically very weak and do not have sufficient strength to produce the required superposition states. However, we are not restricted to unitary transformations. A number of schemes have been suggested which can produce parity cat states non-deterministically [Song, S., Caves, C. M., and Yurke, B. Generation of superpositions of classically distinguishable quantum states from optical back-action evasion. *Phys. Rev. A* 41, 5261-5264 (1990), Dakna, M., Anhut, T., Opatrny, T., Knill, L., and Welsch, D. G. Generating schrodinger-cat-like states by means of conditional measurements on a beamsplitter. *Phys. Rev. A* 55, 3184-3194 (1997)] and some experimental progress has been made in their production [Monroe, C., Meekhof, D. M., King, B. E., and Wineland, D. J. A "schrodinger cat" superposition state of an atom. *Science* 272, 1131-1136 (1996), Brune, M., Hagley, E., Dreyer, J., Maitre, X., Maali, A., C. Wunderlich, Raimond, J. M., and Haroche, S. Observing the progressive decoherence of the "meter" in a quantum measurement. *Phys. Rev. Lett.* 77, 4887-4890 (1996), Turchette, Q. A., Hood, C. J., Lange, W., Mabuchi, H., and H. J. Kimble. Measurement of conditional phase shifts for quantum logic. *Phys. Rev. Lett.* 75, 4710-4713 (1995)]. In all these schemes it is necessary to distinguish between a photon (or phonon) number of n and n±1. If cat states could be used as a resource to deterministically implement the Hadamard gate then these types of schemes would be sufficient for our purposes. We will now show this is true.

BRIEF DESCRIPTION OF THE DRAWINGS

Embodiments of the invention will now be described, by way of example only, with reference to the accompanying drawings, in which.

DETAILED DESCRIPTION

Figure 1:
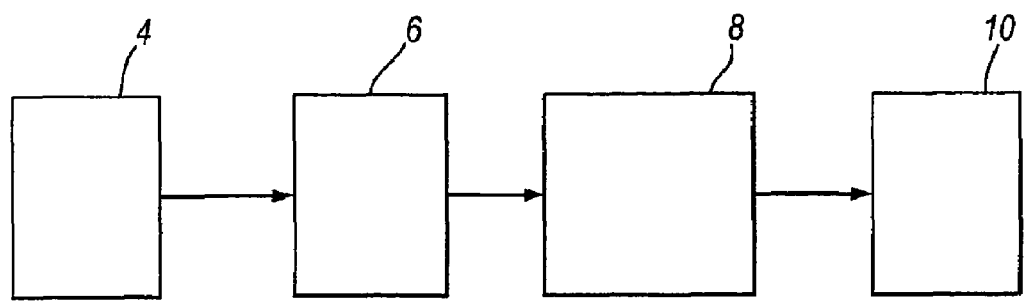
FIG. 1 is a schematic diagram of an embodiment of an apparatus according to the present invention and by which the method of the present invention may be carried out.

Referring to FIG. 1, there is shown a quantum information processing apparatus 2 comprising a source 4 of a multi-photon states |α>, in this case a single mode, stabilized laser, and a means 6 for encoding logical qubits $|0>_L$ and $|1>_L$ as different ones of the vacuum state |0> and |α>. The apparatus includes an optical processing means, 8, which may include one or more two-qubit gates to perform the desired quantum information processing and a homodyne detector, 10, for effecting a readout of the result of the quantum information processing.

A Hadamard gate can be implemented using the two qubit beamsplitter (BS) gate discussed above with one of the inputs being the arbitrary state we wish to transform and the second input being a known cat state. One of the outputs of the gate is measured in the "cat basis" (see below) and, depending on the result, a bit flip operation may be required. This is a specific example of quantum gate implementation via measurement. A general discussion of such techniques can be found in Reference [Nielsen, M. and Chuang, I. *Quantum computation and quantum information*. Cambridge University Press, Cambridge, UK, (2000)].

Figure 2:
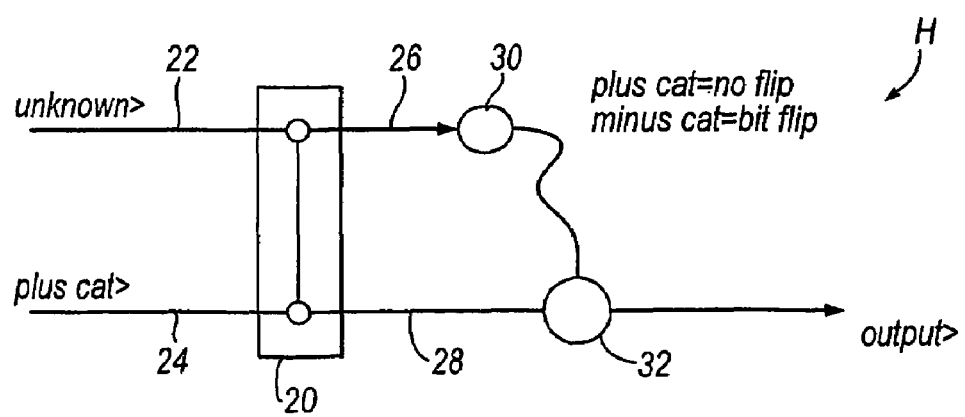
FIG. 2 is a schematic diagram of a Hadamard gate useful with the apparatus and method of the present invention.

FIG. 2 shows one possible arrangement of such a Hadamard gate H implemented by a beamsplitter. The beamsplitter gate of FIG. 2 includes a beamsplitter 20 which has a first input port 22, a second input port 24, a first output port 26 and a second ouput port 28. A state measurement device 30 is arranged to determine whether the state output at the first output port 26 is the same as a cat state input at the second input port 24. A bit flip device 32 is coupled to receive the output state from the second output port 28 and is controlled by the state measurement device 30 to implement at bit flip on the output from the second output port 28 if the state from the first output port 26 is not the same as the cat state input at the second input port 24. This Hadamard gate of FIG. 2 operates as follows. Suppose the state we wish to transform, in the arbitrary state $\mu|0\rangle+\nu|\alpha\rangle$, is inserted into the first input port 22 of the BS H gate whilst a resource cat state $1/\sqrt{2}(|0\rangle+|\alpha\rangle)$ is inserted into the second input port 24. The output state of the gate H at the second output port 28 is $$\frac{\mu}{\sqrt{2}}(|0\rangle_1|0\rangle_2+|0\rangle_1|\alpha\rangle_2)+\frac{\nu}{\sqrt{2}}(|\alpha\rangle_1|0\rangle_2-|\alpha\rangle_1|\alpha\rangle_2) \quad (12)$$

Now a measurement is made on first output port 26 by device 30 which returns a dichotomic result telling us whether we have the same cat state as we inserted at the second input port 24 or the (near) orthogonal state $1/\sqrt{2}(|0\rangle-|\alpha\rangle)$. If the result is the same cat state then the state of output second port 28 is projected into $$\frac{1}{2}(\mu+\nu)|0\rangle+\frac{1}{2}(\mu-\nu)|\alpha\rangle \quad (13)$$

This is the required Hadamard transformation. On the other hand if the opposite cat is measured at the first output port 26 as was inserted then the projected output state is $$\frac{1}{2}(\mu-\nu)|0\rangle+\frac{1}{2}(\mu+\nu)|\alpha\rangle \quad (14)$$

But the state of Eq. 14 only differs from that of Eq. 13 by a bit flip operation. Thus the final step of the gate is to implement (if necessary) by the bit flip device 32 a bit flip on the state from the second output port 28.

A cat basis measurement of the state measurement device 30 may be implemented in the following way. First we displace by $-\alpha/2$. This transforms our "0", "$\alpha$" superposition into "$\alpha/2$", "$-\alpha/2$" superposition:

$$D(-\alpha/2)1/\sqrt{2}(|0\rangle\pm|\alpha\rangle)=1/\sqrt{2}(|-\alpha/2\rangle\pm|\alpha/2\rangle) \quad (15)$$

These new states are parity eigenstates. Thus if photon number is measured then an even result indicates detection of the state $1/\sqrt{2}(|\alpha/2\rangle+|-\alpha/2\rangle)$ and therefore $1/\sqrt{2}(|0\rangle+|\alpha\rangle)$ whilst similarly an odd result indicates detection of $1/\sqrt{2}(|0\rangle-|\alpha\rangle)$ as can be confirmed by direct calculation. The cats could also be distinguished by homodyne detection looking at the imaginary quadrature [Ralph, T. C., G. J. Milburn and W. J. Munro. Coherent state quantum computing in preparation (2001)]. This latter technique would give inconclusive results some of the time but may be useful for initial experimental demonstrations.

Figure 3:
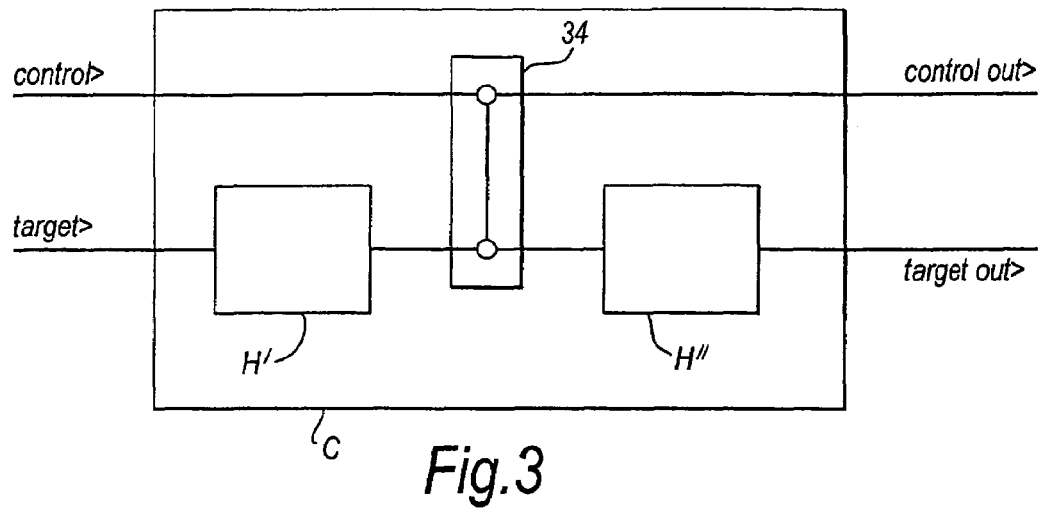
FIG. 3 is a schematic diagram of a CNOT gate useful with the apparatus and method of the present invention.
Figure 4:
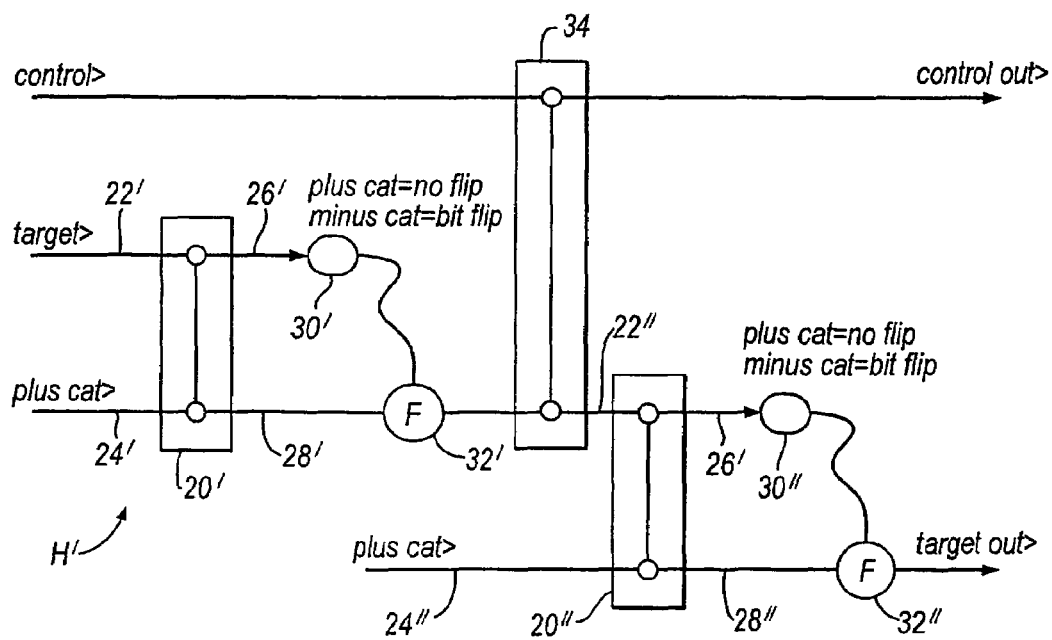
FIG. 4 is a diagram is showing the CNOT gate of FIG. 3 in greater detail.

The control not gate (CNOT) is ubiquitous in quantum processing tasks. It is also the simplest two-qubit gate whose operation can easily be experimentally verified in the computational basis. A CNOT gate will flip the state of one of the input qubits, the "target", only if the other qubit, the "control", is in the logical one state. If the control is in the logical zero state the target is unchanged. A CNOT gate C can be implemented as shown in FIG. 3 by first applying a first Hadamard gate H' to a target state followed by the beam-splitter gate 34 applied to the control and target. Finally, another Hadamard gate H" is applied to the target. For arbitrary control and target input qubits we find:

$$H_tU_{BS}H_t(\mu|0\rangle+\nu|\alpha\rangle)_c(\gamma|0\rangle+\tau|\alpha\rangle)_t=\mu\gamma|0\rangle|0\rangle+\mu\tau|0\rangle|\alpha\rangle+ \nu\tau|\alpha\rangle|0\rangle+\nu\gamma|\alpha\rangle|\alpha\rangle \quad (16)$$

which displays CNOT logic. The result of Eq. 16 assumes $\alpha\gg1$. The CNOT gate C of FIG. 3 is shown in more detail in FIG. 4 in which each of the Hadamard gates H' and H" of FIG. 4 is as the Hadamard gate H of FIG. 2, the components of the Hadamard gates H' and H" being denoted by the same reference numerals of the Hadamard gate H of FIG. 2 but with a prime and a double prime indicator, respectively. The operation of the two Hadamard gates H' and H" is as described with reference to the Hadamard gate H of FIG. 2.

To evaluate just how large a needs to be we use the exact expression for the BS gate, as given in Eq. 5, to calculate the output-state of the CNOT gate C. We will assume here ideal bit flip operations and cat state preparation. The figure of merit is the average fidelity between the exact output and the ideal output, as given by Eq. 16.

Figure 5A:
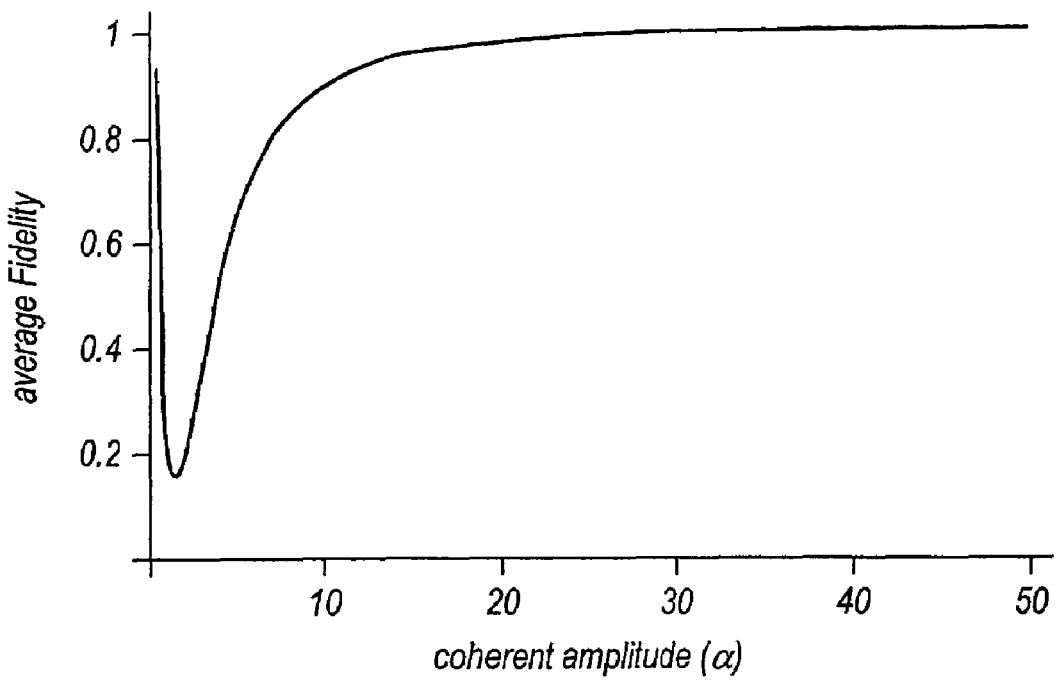
FIGS. 5a and 5b are graphs of the average fidelity and renormalized average fidelity of the output of the CNOT gate of FIG. 3.
Figure 5B:
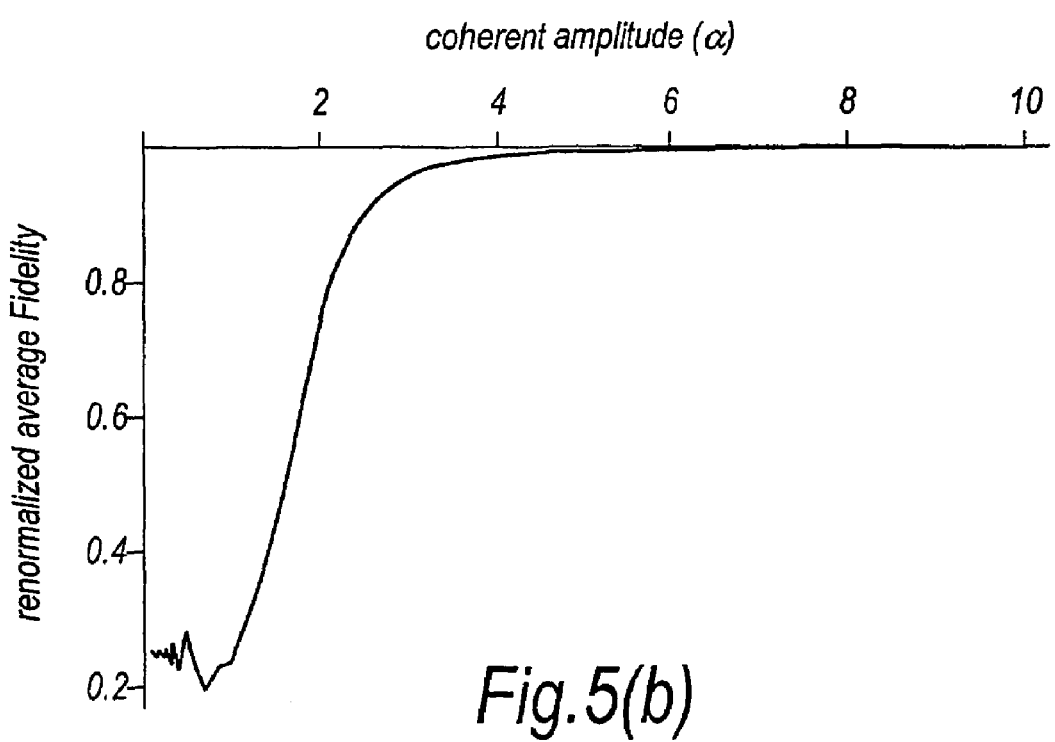

The results are shown in FIG. 5. In FIG. 5(a) the average fidelity is plotted as a function of $\alpha$. Fidelities of 0.9 and above require $\alpha>10$. Such signal sizes, although commonplace in the computational basis would be challenging to produce and control in the superposition basis and the required technology is probably some years away. On the other hand in FIG. 5(b) a renormalised average fidelity is plotted. This is obtained by normalising the fidelity of getting the correct output-state against the sum of the fidelities for all the possible output states in the computational subensemble. If there was no movement of states out of this subensemble one would expect the two plots to be identical. The fact that the renormalised fidelities remain high for much lower values of $\alpha$ shows that qubit leakage is the major reason for the decreasing fidelities at moderate levels of $\alpha$ in FIG. 5(a). This in turn suggests that experimental demonstrations, albeit with low efficiency, may be possible for $\alpha$'s as small as 3. It also shows that the gates may be run in a non-deterministic, high fidelity, fashion at low values of $\alpha$. Scaling up of such non-deterministic gates can be achieved through the known technique of gate teleportation.

The major sources of error in our scheme are expected to be, in order of increasing significance: (i) errors due to non orthogonal code states, (ii) errors due to failure of the two qubit gate condition ($\theta^2\alpha\ll1$), (iii) erroneous identifications of the input cat resource, (iv) photon loss, and (v) errors due to random optical phase shifts. The first source of error becomes negligible for $\alpha>3$ (see Eq. 3). FIG. 3(a) shows that the second source of errors is small for $\alpha>20$. The third source is equivalent to a small rotation error in the code space; the fourth source causes a collapse to the one logical state, while the final source is a phase error. It can be shown [Ralph, T. C., G. J. Milburn, and W. J. Munro. Coherent state quantum computing in preparation (2001)] that good quantum error correction codes are available to correct these errors and further that error correction can be implemented in a fault tolerant fashion.

In this application we have presented a quantum computation scheme based on encoding qubits as vacuum and coherent states, and their superposition. The optical networks required are simple and compatible with current optical communication networks. As well as the long-term goal of quantum computation, applications in quantum communication protocols seem likely. Although the coherent amplitudes needed for scalable computation are quite large our results indicate that experimental demonstrations with modest amplitudes should be possible.

While specific optical implementations have been shown, it is apparent that this invention could also be practised utilizing other optical implementations and that other modifications in the specific equipment shown for performing the functions will be possible, depending on application. Thus, while the invention has been particularly shown and described above with reference to preferred embodiments, the foregoing and other changes in form and detail may be made therein by one skilled in the art without departing from the spirit and scope of the invention.

The invention claimed is:

1. A method of quantum information processing: in which logical qubits $|0\rangle_L$ and $|1\rangle_L$ are respectively encoded by different near orthogonal coherent states $|\beta\rangle$ and $|\alpha\rangle$, where $\langle\alpha|\beta\rangle\approx0$, $|\alpha\rangle$ and $|\beta\rangle$ being the computation basis states for the qubits; in which said logical qubits $|0\rangle_L$ and $|1\rangle_L$ are respectively encoded by different ones of the vacuum state $|0\rangle$ and a multi-photon optical coherent state $|\alpha\rangle$, $|0\rangle$ and $|\alpha\rangle$ being the computation basis states for the qubits; and in which the control and target states of a gate are initially in the combined state $|\phi_{CT}\rangle^{in}$ where $$|\phi_{CT}\rangle^{in} = C_0|0\rangle_C|0\rangle_T + C_1|0\rangle_C|\alpha\rangle_T + C_2|\alpha\rangle_C|0\rangle_T + C_3|\alpha\rangle_C|\alpha\rangle_T$$

and in which this combined state is manipulated to produce a combined output state $|\phi_{CT}\rangle^{out}$ where $$|\phi_{CT}\rangle^{out} = C_0|0\rangle_C|0\rangle_T + C_1|0\rangle_C|\alpha\rangle_T + C_2|\alpha\rangle_C|0\rangle_T - C_3|\alpha\rangle_C|\alpha\rangle_T$$

where $$\sum_{i=0}^{3}|C_i|^2 = 1$$

and in which the control and the target qubits are manipulated by the gate such that the input states $|0\rangle_C|0\rangle_T$, $|0\rangle_C|\alpha\rangle_T$, $|\alpha\rangle_C|0\rangle_T$, $|\alpha\rangle_C|\alpha\rangle_T$ are transformed to the output states $|0\rangle_C|0\rangle_T$, $|0\rangle_C|\alpha\rangle_T$, $|\alpha\rangle_C|0\rangle_T$, $-|\alpha\rangle_C|\alpha\rangle_T$, respectively.

2. The method of claim 1, in which the control qubit and the target qubit are manipulated by a beamsplitter.

3. The method of claim 1, in which the control qubit and target qubit are manipulated using a Kerr medium.

4. The method of claim 1, in which a phase shift is imposed on a qubit to produce a rotation that is diagonal to the computational basis states.

5. The method of claim 1 in which the states $|\alpha\rangle$ and $|\beta\rangle$ are the output states of a single mode, stabilised laser, a waveguide or a molecule.

6. The method of claim 1 in which readout of a qubit is effected by homodyne detection and/or a parity measurement.

7. The method of claim 1 in which $\alpha \geq 3$.

8. The method of claim 1 in which $\alpha \geq 10$.

9. The method of claim 1 in which $\alpha \geq 20$.

10. A method of quantum information processing: in which logical qubits $|0\rangle_L$ and $|1\rangle_L$ are respectively encoded by different near orthogonal coherent states $|\beta\rangle$ and $|\alpha\rangle$, where $\langle\alpha|\beta\rangle\approx0$, $|\alpha\rangle$ and $|\beta\rangle$ being the computation basis states for the qubits; in which said logical qubits $|0\rangle_L$ and $|1\rangle_L$ are respectively encoded by different ones of the vacuum state $|0\rangle$ and a multi-photon optical coherent state $|\alpha\rangle$, $|0\rangle$ and $|\alpha\rangle$ being the computation basis states for the qubits; and in which a qubit is subject to a bit flip transformation in which the qubit interacts with a coherent optical field of sufficient strength on a highly reflective beamsplitter to produce a displacement of $-\alpha$, where $D(\alpha)|0\rangle=|\alpha\rangle$ followed by a half-wavelength delay to provide a $\pi$ phase shift of the coherent amplitude, the input states $|0\rangle$ and $|\alpha\rangle$ being transformed to the output states $|\alpha\rangle$ and $|0\rangle$, respectively.

11. A method of quantum information processing: in which logical qubits $|0\rangle_L$ and $|1\rangle_L$ are respectively encoded by different near orthogonal coherent states $|\beta\rangle$ and $|\alpha\rangle$, where $\langle\alpha|\beta\rangle\approx0$, $|\alpha\rangle$ and $|\beta\rangle$ being the computation basis states for the qubits; in which said logical qubits $|0\rangle_L$ and $|1\rangle_L$ are respectively encoded by different ones of the vacuum state $|0\rangle$ and a multi-photon optical coherent state $|\alpha\rangle$, $|0\rangle$ and $|\alpha\rangle$ being the computation basis states for the qubits; and in which the control qubit is an arbitrary state to be transformed according to a predetermined qubit rotation, and the target qubit is the state $$\frac{1}{\sqrt{2}}(|0\rangle + |\alpha\rangle),$$

the output states being subject to a bit flip transformation if the output control qubit is determined not to be the same state as the control state.

12. The method of claim 11 in which the step of determining whether the input control state and the output control state are the same includes displacing the output control state by $-\alpha/2$ and determining if the photon number of the displaced output control state is odd or even.

13. The method of claim 12 in which the step of determining whether the input control state and output control state are the same includes homodyne detection of the imaginary quadrature of the output control state.

* * * * *